United States Patent [19]

Tung et al.

[11] Patent Number: 5,765,501
[45] Date of Patent: Jun. 16, 1998

[54] MARKER FOR SCALE OF AN INDICATOR

[75] Inventors: Shu-Lin Tung, Taoyuang; Bii-Junq Chang, Hsin-Chu; Jen-Song Liu, Taipei, all of Taiwan

[73] Assignee: Taiwan Semiconductor Manufacturing Company, Ltd., Hsin-Chu, Taiwan

[21] Appl. No.: 657,070

[22] Filed: Jun. 3, 1996

[51] Int. Cl.⁶ .................. G01D 13/22; G09F 9/00
[52] U.S. Cl. ........................... 116/323; 116/322
[58] Field of Search .................. 116/62.3, 62.4, 116/296, 304, 319, 320, 321, 322, 323, 324, 328, 309, 310, 311, 312, 313, 314, 315, 316, 317, 318

[56] References Cited

U.S. PATENT DOCUMENTS 2,707,931  5/1955  Boat et al. .................... 116/296
2,814,267  11/1957  Goldstein et al. ............. 116/323
4,793,278  12/1988  Gillick ........................... 116/323
5,427,009  6/1995  LaPlante ........................ 84/413

FOREIGN PATENT DOCUMENTS 376852  7/1932  United Kingdom ............. 116/321

Primary Examiner—William A. Cuchlinski, Jr.
Assistant Examiner—Willie Morris Worth
Attorney, Agent, or Firm—George O. Saile; Stephen B. Ackerman; William Robertson

[57] ABSTRACT

A gauge marker system has a flexible track that fits around the circumference of a gauge housing and carries one or more markers that extend over the face of the gauge to indicate a dial position that is to be noticed by a person using the gauge. The markers can be slid along the track to a selected position. The track is adapted to be fastened to the gauge by a cable tie that lies in a groove on the track.

12 Claims, 2 Drawing Sheets

MARKER FOR SCALE OF AN INDICATOR

FIELD OF THE INVENTION

This invention relates generally to dial indicators with a rotary pointer and an arcuate scale. More specifically it relates to an improved marker for marking a point on the scale.

INTRODUCTION

Dial indicators are familiar in many forms. Commonly, the indicator has a circular face with a scale that represents some physical quantity such as temperature or pressure. A pointer is pivoted at the center of the circle and is turned by an actuating means to indicate a value on the scale. Commonly the indicator has a cylindrical rear housing part that holds the actuating means, the pointer, and the dial. The rear housing part also carries a mounting structure and also carries tubes or wires that supply the information for positioning the pointer. A forward housing part (a rim) holds a glass over the pointer and dial.

These dial indicators are also called gauges, the term that will be used here.

Often it is desirable to place one or more markers at fixed positions on the scale. A familiar example is a barometer with a manually adjustable pointer pivoted in the center of the glass. A person using the barometer turns the marker pointer to the current position of the indicating pointer and thereafter the rise or fall of the barometer can be noted by comparing the position of the indicating pointer with the position of the marker pointer. Markers are also used, for example, to indicate a normal operating value or to indicate a safe range of operation.

THE PRIOR ART

U.S. Pat. No. 5,427,009 teaches an indicator marker with an arcuate track 216 (FIGS. 12 and 13) that carries adjustable indicators 215. A pointer 214 pivots past the markers.

SUMMARY OF THE INVENTION

It is a general object in this art to provide a marker system for a gauge in which the markers are easy to see and easy to adjust. It is also a general object to reduce the cost of the marker system and to make it easy to install on a gauge. One object of this invention is to provide an improved marker system that achieves these objects.

This marker system has a track that fits over the rim of the gauge. It conforms to the cylindrical shape of the rim of the gauge housing, and it has means for locating the marker system axially with respect to a rear edge of the rim.

One or more markers are adapted to ride in the track and to overhang the gauge glass to mark a selected point on the scale. Preferably the markers are made in a variety of colors and the colors have a predetermined significance to the people using the gauge, for example to identify a normal operating position or range or to identify a position requiring some action.

The track has a groove that receives a cable-tie that is tightened to hold the marker system to the gauge housing. The marker system can be easily installed on a gauge and it can be removed by cutting the cable tie.

Cable ties are well known and they are commonly used for tieing together a bundle of electrical conductors. A cable tie comprises a strip of plastic with a locking mechanism at the one end and a taper at the other end to simplify looping this end through the locking mechanism. The mid-section of the strip has a serration that give it a non-releasing grip. They are commercially available in a range of sizes.

The preferred track has a length that is slightly less than the circumference of the indicator housing at the axial location of the point were it is to be located. A marker can be easily positioned on the track and it holds its position in casual handling. A user of the marker system can add markers to the track by sliding a marker onto the track at the gap between its ends. A marker can be remove by the reverse procedure.

Other features and advantages of the invention will appear from the description of the preferred embodiment.

THE DRAWING

THE PREFERRED EMBODIMENT

Figure 1:
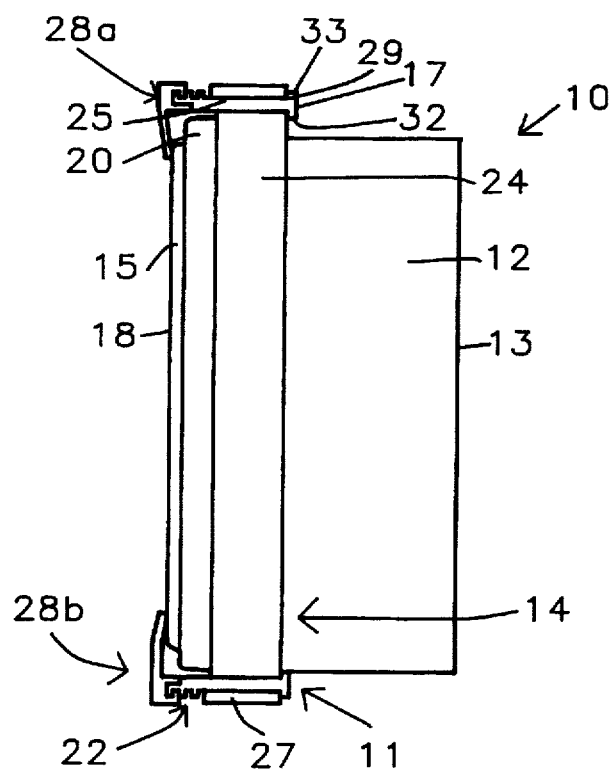
FIG. 1 is a side view of a gauge with the marker apparatus of this invention shown partly in section.

Introduction—FIG. 1

In the side view of FIG. 1, a gauge 10 faces to the left. Conversely, to the right in FIG. 1 is to the rear of the gauge. The gauge has a rear housing part 11 (the case) with a surface 12 that is cylindrical and with a rear wall 13 that is flat and circular. The axis of this cylindrical and circular case rear part is the axis of a pivoting or rotating pointer that can be viewed from the front. It will be helpful to use this arbitrary orientation of the gauge in describing the invention. Similarly it will be convenient to use the terms "up" and "down" and equivalent terms for "radially outward" and "radially inward" respectively.

A forward housing part 14 (the rim) is attached to case 11 and holds a circular glass 15 (usually made of plastic). The case, the rim and the glass cooperate to form an enclosure for a dial, a dial pointer and an actuator for the pointer. Gauges of this general type are well known, and these components, which are well known and not specifically relevant to this invention, are not shown in the drawing.

Rim 14 fits over the front of the case and has a rear edge 17 that forms a step with surface 12 of the case. Edge 17 is used for locating the axial position of the marker system, as will be explained, and from a more general standpoint, edge 17 is an annular structure that forms this reference. (For example, the gauge can have an extended vertical surface that forms edge 17.) As will be explained later, the markers extend radially inward into the visual space defined by the glass, and the forward-most surface 18 of the glass 15 forms another reference surface for the marker assembly.

In the exemplary gauge of the drawing, the forward part of rim 14 has a stepped construction with a flat annular surface 19 and a curved surface 20. From a more general standpoint, surfaces 19 and 20 represent surfaces of rim 14 near the markers 28 that may have various shapes and are not used as a position reference.

The Marker System—FIG. 1

FIG. 1 also shows the preferred marker system 22: a track 24 that fits the outer surface 25 of rim 14, a cable tie 27 that holds track 24 to surface 25, and two representative markers 28*a* and 28*b*. These components will be described in detail in the description of FIG. 3.

Figure 2:
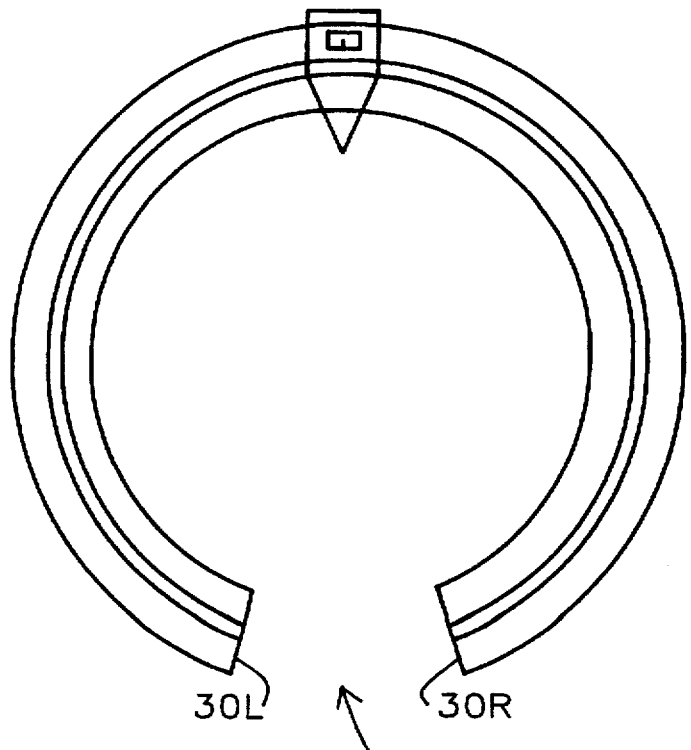
FIG. 2 is front view of the marker apparatus of FIG. 2.

The Marker System—FIG. 2

In the front view of FIG. 2, the marker track 24 is curved in the shape of surface 25 of rim 14 of FIG. 1. The rim 14 and the glass 15 are not shown but their general position will be understood generally from the circular shape of the track 24 and will be understood more specifically from the surfaces of the track that contact surfaces of the rim.

The track is preferably made of plastic and, depending on its stiffness, it can be made flat and given the curved shape only as it is mounted on a rim or it can be given an initial curved shape with a radius for a gauge rim of a particular radius and then flexed to fit has a rim of a different radius.

A dial behind the glass carries a scale and a pointer pivots at the axis of the housing to point to a position on the scale. These components will be understood and are not shown in the drawing.

Note that markers 28a and 28b in FIG. 1 are shown at the top and bottom of the gauge (to simplify the edge view). The single representative marker in FIG. 2 is identified by reference character 28 and is located arbitrarily at the top of the dial.

Marker 28 as seen from the front has a suitable width (in the circumferential direction of the track) to ride securely on track 22 and a suitable radial length to extend inwardly a suitable distance to visually mark a position on the scale. The marker is shaped to identify a position on the scale and the preferred marker has a triangular shape pointing to the scale. It extends inwardly far enough to slightly overlap the tip of the pointer. The preferred marker is made of plastic and can be easily given a bright color.

A gap 29 between the ends 30r, 30l (right and left) of the track is shown at the bottom of the dial because dial pointers commonly move through a limited arc at the top of the dial, and the scale is commonly interrupted at the bottom. However, the gap can be located at any convenient position of the dial, or the track 24 can be given a length to substantially eliminate the gap.

The gap 29 in FIG. 2 represents a track length selected to cover the dial range on a gauge having a particular rim radius. Alternatively, the gap can represent or suggest a large gap when the system is used with a larger than usual dial. As another alternative, tracks can be made in various lengths or a track that is longer than needed for a particular gauge can be cut to a suitable length.

Figure 3A:
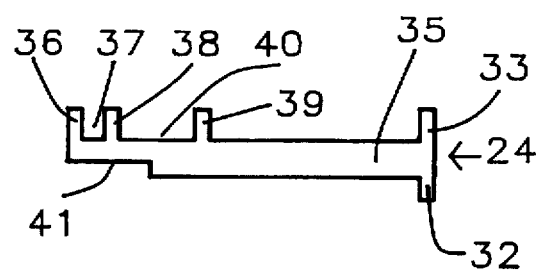
FIG. 3 is an enlarged side view, partly exploded, of part of the gauge and marker apparatus of FIG. 3.
Figure 3B:
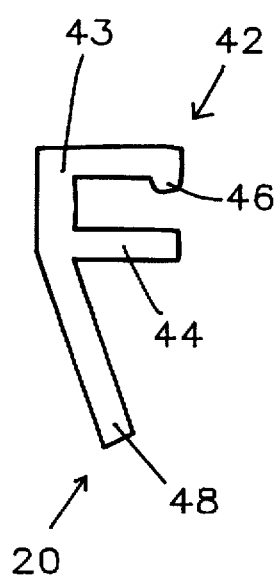
Figure 3C:
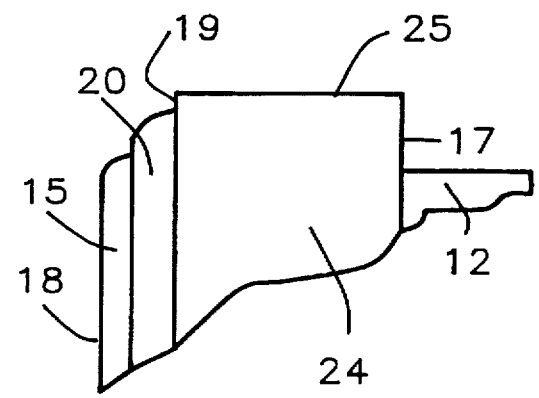

The Marker System—FIG. 3

The track 24 has a vertical flange at its rear with a radially inward extending part 32 that overhangs the edge 17 of the rim. The track is placed on rim 14 with part 32 against edge 17 to suitably locate the forward-most position of the track. (The track won't be slipped off the rear from casual handling when it is clamped, and the usual gauge fittings, not shown in the drawing, will limit the rearward movement of the track.) Track 24 has a radially outward extending part 33 that forms a rear wall of a groove 35 for a cable tie 27. The track 24 also has an outwardly extending ridge 36 at its forward edge that forms a forward wall of a groove 37 that holds the marker. Groove 35 is given a width to hold a standard cable tie of a selected size, and groove 37 is given a suitable width to cooperate with the marker, as explained later.

The axial width of the track is made sufficient to extend from edge 17 to a suitable position forward of the glass surface 18 (described later). In the preferred embodiment, a ridge 38 forms the rear wall of groove 37 for the marker, and a ridge 39 forms the forward wall of groove 35 for the cable tie. Ridges 38 and 39 are spaced apart and form a groove 40 which functions only to provide the appropriate spacing between grooves 37 and 39. Track 24 also has a ledge 41 along its radially inward forward edge. This ledge cooperates with the marker, as will be explained next.

The Track Engaging Means

The marker has means 42 for engaging the track. Marker 28 has a part 43 that extends rearward to overly ridge 26 and it has a part 44 that extends rearward to underlie the track and to ride on ledge 41. A radially inward protrusion 46 on part 43 extends into grove 37 to hold the marker to the track. The marker is held in its circumferential position on the track by the friction between the track engaging components and the track. Preferably the friction is in a range to permit the markers to be positioned after the marker system has mounted on a gauge but to hold the marker in position against casual force.

The pointer part 48 of the marker extends rearward at a slight angle to strike against the surface 18 of glass 15. When the marker strikes the glass, there is less parallax distortion of the marker position on the scale. (The friction of the marker on the glass is not intended to hold the marker in its circumferential position, but if a marker becomes loose, it can be tightened by sliding the track slightly to the rear.)

Assembly

The markers for a particular gauge are selected, for example as to color, and a track is selected with the appropriate axial width and with an appropriate initial length (or a longer length is cut to fit the gauge). The markers are slid onto the track and the track is wrapped around the rim of the gauge. A cable tie is positioned in groove 35 and the track is held in position as the cable tie is tightened. Alternatively, the track without the markers can be clamped to the gauge rim and the markers can be fed onto the track at the gap between the track ends. From a more general standpoint, the cable tie is a readily available, strong, band that fits into groove 35 and clamps the track to the gauge.

SUMMARY

From the description of a preferred embodiment of the invention and the suggestions for variations and modifications, those skilled in the art will recognize further variations and modifications within the spirit of the invention and the intended scope of the claims.

We claim:

1. For use with a gauge of the type having a dial with a scale defining positions, a pointer for pointing to positions on the scale, an actuator for turning the pointer, a housing having a forward part (14) and a rear part (11), a glass for covering the dial and the pointer, and a circular rim attached to the forward housing part and supporting the glass, an improved marker system (22) for marking positions on the scale comprising, a track (24) adapted to fit over and contact at least a circumferential portion of the rim and to project slightly in front of the glass, the track having a forward edge and having a first axially rearward groove (35) and a second axially forward groove (37) on its outer surface, the first groove being adapted for receiving a clamp (27) encircling the track and holding the track in friction contact with the rim, the track being sufficiently flexible to grip the housing part when the clamping means is applied, and a marker (28) having track engaging means (42) to permit the marker to be slid onto the track to a selected track position and to remain in the position until moved, the marker having a rearwardly extending part (44) adapted to radially underlie the forward edge of the track, the marker having a radially outward part (43, 46) adapted to ride in the track second groove (37), and the marker having a pointer part (48) extending into the scale when the marker system is assembled.

2. The marker system of claim 1 wherein the marker system includes a clamping means (27) adapted to lie in the first groove.

3. The marker system of claim 1 wherein the first groove (35) receives a cable tie for clamping the track to the rim.

4. For use with a gauge of the type having a dial with a scale defining positions, a pointer for pointing to positions on the scale, an actuator for turning the pointer, a housing having a forward part (14) and a rear part (11), a glass for covering the dial and the pointer, and a circular rim attached to the forward housing part and supporting the glass, an improved marker system (22) for marking positions on the scale comprising, a track (24) adapted to fit over and contact at least a circumferential portion of the rim and to project slightly in front of the glass, the track having a forward edge and having a first axially rearward groove (35) and a second axially forward groove (37) on its outer surface, the first groove being adapted for receiving a cable tie clamp (27) encircling the track and holding the track in friction contact with the rim, the track being sufficiently flexible to grip the housing part when the cable tie clamp is applied, and a marker (28) having track engaging means (42) to permit the marker to be slid onto the track to a selected track position and to remain in the position until moved, the marker having a rearwardly extending part (44) adapted to radially underlie the forward edge of the track, the marker having a radially outward part (43, 46) adapted to ride in the track second groove (37), and the marker having a pointer part (48) extending into the scale when the marker system is assembled.

5. The marker system of claim 4 wherein the housing has a circular rear edge (17) and the track has a rear ridge (32) overhanging the housing edge and extending radially inward for locating the track axially on the housing.

6. The marker system of claim 5 wherein the rim is radially larger than the housing rear part and the edge is formed by the rear-most part of the rim.

7. The marker system of claim 6 wherein the track has an outward projecting ridge (33) from its rear edge to form a rear wall of the first groove (35).

8. The marker system of claim 7 wherein the track outer surface has a ridge (39) forming a forward wall of the first groove.

9. The marker system of claim 8 wherein the track engaging means (42) has a part (46) that fits radially downward into the second groove (37) for holding the marker to the track.

10. The marker system of claim 9 wherein the track has two ends defining a predetermined length and wherein the length of the track is shorter than the circumference of the rim where it is to be located and a gap (29) exists between the ends of the track permitting markers to be fed onto an assembled track at the gap.

11. The marker system of claim 10 wherein the track has a ledge (41) on its radially inward forward edge for receiving the marker part (44) underlying the forward edge of the track.

12. The marker system of claim 11 wherein the ridge (39) forming the forward wall of the first groove and the ridge (38) forming the rear wall of the second groove are spaced apart according to the width of the track.

* * * * *